INVENTORS
FRANK K. BAYLESS
HUGH A. ROBINSON
BY
*Carl E. Johnson.*
*John* ATTORNEY

FIG. 4

INVENTORS
FRANK K. BAYLESS
HUGH A. ROBINSON

INVENTORS
FRANK K. BAYLESS
HUGH A. ROBINSON
BY
ATTORNEY

United States Patent Office 3,451,495
Patented June 24, 1969

3,451,495
POWER DEVICES HAVING REVERSIBLE DRIVE
Frank K. Bayless, Darien, Conn., and Hugh A. Robinson, Wenham, Mass., assignors, by direct and mesne assignments, to United Shoe Machinery Corporation, Flemington, N.J., a corporation of New Jersey
Filed May 17, 1966, Ser. No. 550,857
Int. Cl. B62d 51/04; A47l 11/00
U.S. Cl. 180—19                 11 Claims

ABSTRACT OF THE DISCLOSURE

A reversibly self-propelled device, for instance a floor treating machine, has a drive wheel controlled through a transmission by a member manually shiftable to cause movement of the device in corresponding direction. Positioning the control member actuates one or the other or neither of two brakes thus locking either one or none of two circular splines in a harmonic drive mechanism, the compact arrangement thus providing forward, neutral, or reverse propulsion of the device.

---

Our invention pertains, in general, to reversibly self-propelled devices, for example floor treating machine, such as a vacuum cleaner, having a strain wave gearing assembly for transmitting power from a drive motor to a drive wheel which propels the machine across the surface to be cleaned. The nature and principle of operation of various strain wave gearing assemblies are disclosed, and referred to, in United States Letters Patent No. 2,906,143, granted on Sept. 29, 1959, in the name of C. Walton Musser.

A primary object of the present invention is to provide a movably mounted machine or vehicle having mechanism for propelling it in either of two directions, with manually operable control means shiftable to determine a selected direction of propulsion. It will accordingly be appreciated that application of the invention is not limited to surface treating machines of the type herein referred to solely for purposes of illustration, but may be embodied in various reversibly operable conveyances useful in widely different fields.

One object of our invention is to substantially reduce and virtually eliminate the muscular effort required of a person, such as a housewife, in pushing and pulling a vacuum cleaner or similar machine across a surface to be treated.

Another object of our invention is to provide a vacuum cleaner or similar machine which propels itself to and fro across the surface to be treated in response to very small pushing and pulling forces exerted by the person operating the machine.

Another object of our invention is to provide a vacuum cleaner or similar machine which propels itself across the surface being treated away from the operator or toward the operator as the operator applies a small pushing or pulling force, respectively, to the machine in a natural manner as if the operator were really going to push the machine or pull it solely with muscular effort.

Another object of our invention is to provide a self-propelled vacuum cleaner or similar machine which is relatively light in weight and has relatively small bulk.

Another object of our invention is to provide a self-propelled vacuum cleaner or similar machine which includes a propulsion unit having a transmission assembly which is of relatively light weight and small bulk and which, nevertheless, performs high ratio speed and torque conversions.

Another object of our invention is to provide a self-propelled vacuum cleaner or similar machine having a transmission assembly which includes strain wave gearing.

Another object of our invention is to provide a self-propelled vacuum cleaner or similar machine having a propulsion unit which includes a strain wave gearing assembly for providing either a clockwise or counterclockwise rotational output from a unidirectional rotational input to the strain wave gearing assembly.

Another object of our invention is to provide a self-propelled vacuum cleaner or similar machine having a transmission assembly including the aforementioned strain wave gearing assembly wherein the clockwise and counterclockwise rotational outputs are at substantially equal speeds in order that the machine may propel itself forwardly and backwardly on the floor surface at about the same speed in either direction.

One form of our invention is embodied in an upright vacuum cleaner comprising: a cleaning nozzle adapted to be moved over a floor surface to be cleaned, such as a carpeted or rug covered surface; a housing arranged above the cleaning nozzle and containing a dust bag as well as a suction producing motor-fan unit; and a hollow wand pivotally coupled between the cleaning nozzle and the housing for conveying dirt-ladened air from the nozzle to the dust bag in the housing. The upper end of the housing is provided with a handle with which the operator can manually guide the movement of the vacuum cleaner across the floor surface to be cleaned. Mounted on the cleaning nozzle is a motor driven rotary brush which agitates the carpeted floor surface and dislodges dirt and dust therefrom. This dislodged matter is carried by suction induced airflow from the nozzle upwardly through hollow wand and is eventually deposited in the dust bag in the housing.

Also mounted on the cleaning nozzle is a drive wheel for propelling the vacuum cleaner across the floor surface, a transmission assembly for rotating the drive wheel, and an electric motor for rotating the brush as well as for supplying power to the transmission assembly. Coupled between the lower end of the hollow wand and the transmission assembly is a linkage which controls, in the way hereinafter described, the output of the transmission assembly and, hence, the action of the drive wheel. Three different outputs from the transmission assembly and, necessarily, three different actions of the drive wheel are possible, depending on the position of the control linkage; first, it is possible to derive no output from the transmission assembly and, thus, the drive wheel will not rotate so that the vacuum cleaner will not move either to or fro across the floor surface. Second, the output causes the drive wheel to rotate in such a direction as to move the vacuum cleaner in a forward direction, away from the operator. Third, the output is such as to cause the drive wheel to rotate in an opposite direction to move the vacuum cleaner toward the operator.

The transmission assembly includes a strain wave gearing assembly having two rigid output ring gears having internal teeth and which rotate independently of each other in opposite directions when they are driven by an externally toothed flexible strain gear common to both of the ring gears. The strain gear is ellipsoidally deformed by an internal coaxial strain inducer which is rotated unidirectionally by the electric motor. Two pulleys are fastened to the drive wheel's shaft and each of these pulleys is coupled by separate endless belts to a different one of the ring gears. Two brake bands are also provided, one for each of the ring gears. Associated with the brake bands and the endless belts is a tensioning mechanism which is operated by the movement of the aforesaid control linkage.

When the operator applies a small pushing force to the handle of the vacuum cleaner in a natural way, as if she were going to propel the cleaner away from herself and across the floor surfaces solely by muscular effort, the force is transmitted through the wand to move the control linkage. The control linkage then operates the tensioning mechanism which functions to slacken the brake band on one of the ring gears to permit it to rotate and at the same time the other brake band is tensioned against the other ring gear to arrest its rotary motion. While the aforesaid brake bands are being tensioned and slackened the tensioning mechanism also acts to tension and slacken the endless drive belts. The belt associated with the ring gear which is allowed to rotate is tensioned against the latter so that the pulley coupled thereto will be rotated in such a direction as to cause the drive wheel to rotate and propel the cleaner forwardly away from the operator. Simultaneously, the drive belt associated with the arrested ring gear is slackened so that the pulley associated with this arrested ring gear may rotate with the drive wheel which is driven by the other belt.

By applying a small pulling force to the handle of the cleaner in the aforesaid natural way the control linkage is moved in an opposite direction. As a result, the formerly tensioned brake band and tensioned belt are slackened and the formerly slackened brake band and slackened belt become tensioned with the result that the other of the drive pulleys, which was formerly inactive, is rotated by the tensioned belt which is driven by the formerly stationary ring gear. As a consequence the drive wheel is rotated in the opposite direction thereby propelling the cleaner backwardly toward the operator.

If the operator neither pushes nor pulls the handle from a neutral position the tensioning mechanism will not act to tension either of the brake bands or either of the endless belts and the two ring gears will rotate at substantially the same speed in opposite directions. However, since both of the endless drive belts are slackened the belts will not transmit any motion to the drive pulleys so that the drive wheel will remain stationary.

Other objects as well as various features and advantages of our invention will appear by referring to the following detailed description of an illustrative embodiment thereof and to the accompanying drawings in which.

Figure 1:
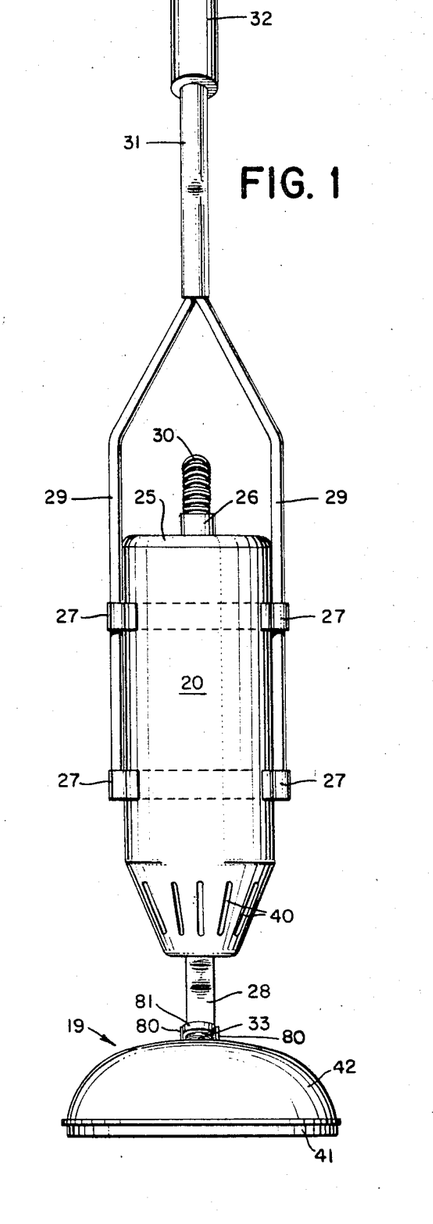
FIG. 1 is a front elevation view of a self-propelled upright vacuum cleaner in accordance with our invention.
Figure 2:
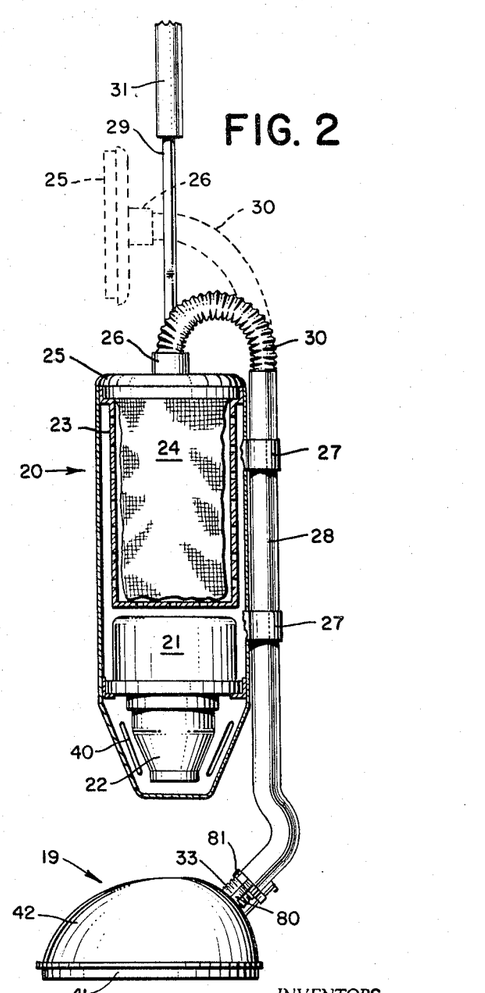
FIG. 2 is a side elevation view of the vacuum cleaner of FIG. 1 partly cut away to show the dust bag and motor-fan unit of the vacuum cleaner.
Figure 3:
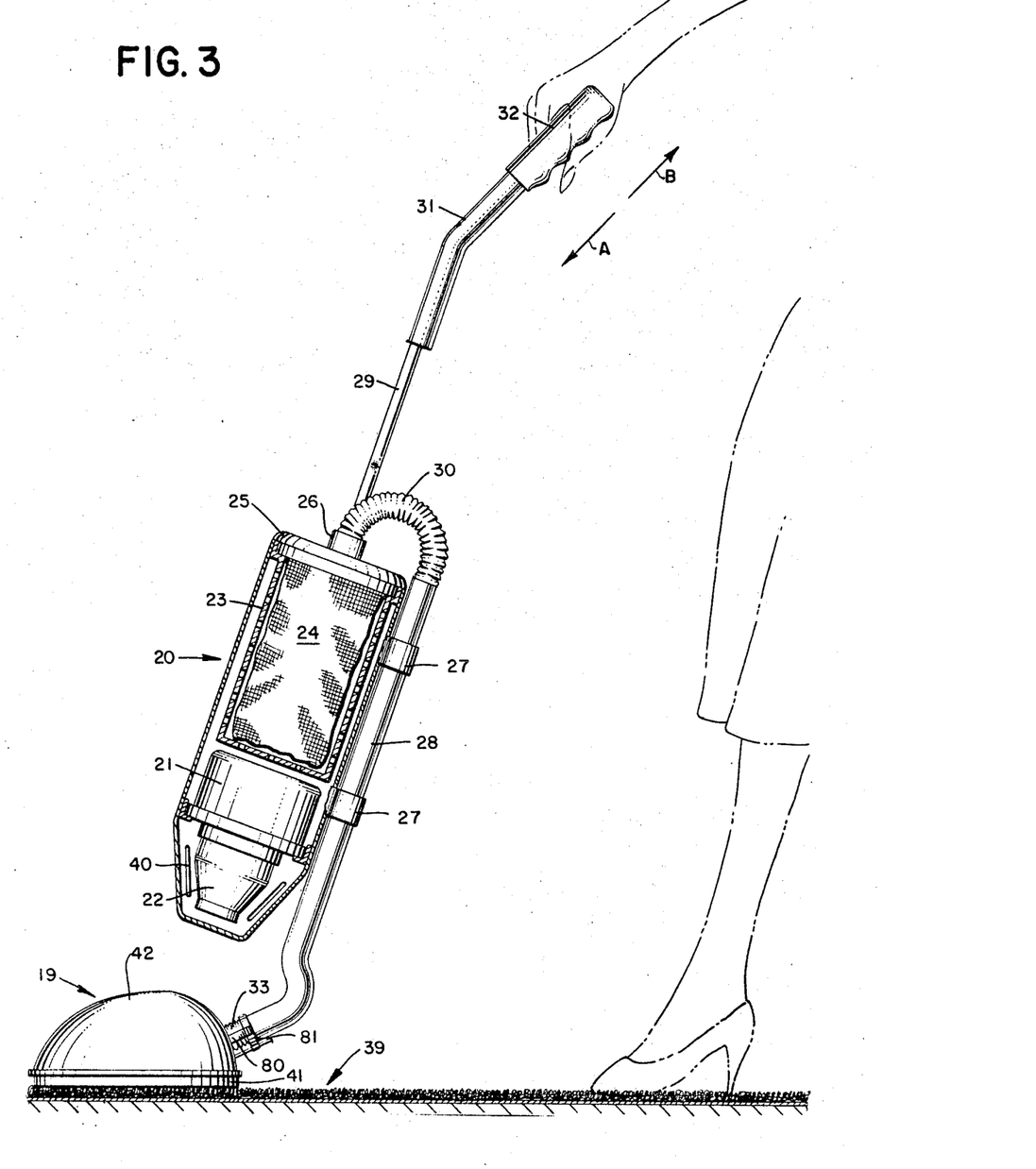
FIG. 3 is an illustration showing a person operating the vacuum cleaner.

A vacuum cleaner of the upright type is shown in FIGS. 1, 2 and 3. The vacuum cleaner includes a floor cleaning nozzle 19 and a housing 20 which is located above the nozzle 19. The housing 20 contains a suction producing centrifugal fan 21 which is driven by an electric motor 22. Located within the housing 20 above the fan 21 is a compartment 23 within which a porous dust bag 24 is situated. This dust bag may be of the disposable paper type having a stiff cardboard end closure with an aperture therein through which dirt-laden air can enter the bag. The uppermost end of the housing 20 is open. However, a movable cover 25 is provided for closing this open upper end. The cover 25 has a hole therein and a short rigid suction inlet pipe 26 is secured to the cover 25 and extends through the aforesaid hole therein.

Fastened to the outside of the housing 20 by the two clamps 27, 27 is a rigid hollow wand 28 and two oppositely disposed rigid tubular arms 29, 29. The hollow wand 28, clamps 27 and arms 29 may be fashioned from steel or the like. Advantageously, all of these parts may be welded together to form a rigid structure. A hollow flexible conduit 30 is provided for coupling the upper end of the suction inlet pipe 26 with the upper end of the wand 28. Thus, dirt-laden air from the surface cleaning nozzle 19 can flow through the rigid hollow wand 28, the flexible conduit 30 and the suction inlet pipe 26 into the porous dust bag 24. The flexible conduit 30 may be permanently secured to the ends of the suction inlet pipe 26 and the rigid hollow wand 28. Cover 25 may be attached by latches (not shown) to the open end of the housing 20 to close said open end. When a filled dust bag 24 is to be removed and a new one inserted in the dust bag compartment 23, the cover 25 and the flexible conduit 30 may be swung upwardly to uncover the end of the housing 20 as shown in dotted lines in FIG. 2. As shown at FIG. 1, the upper portions of the two oppositely disposed tubular arms 29 converge inwardly beginning at a distance above the cover 25 which is sufficient to allow the cover to be swung open. Welded or otherwise secured to the ends of arms 29 is a tubular handle 31 and at the upper end of handle 31 there is located a hand grip 32.

Figure 5:
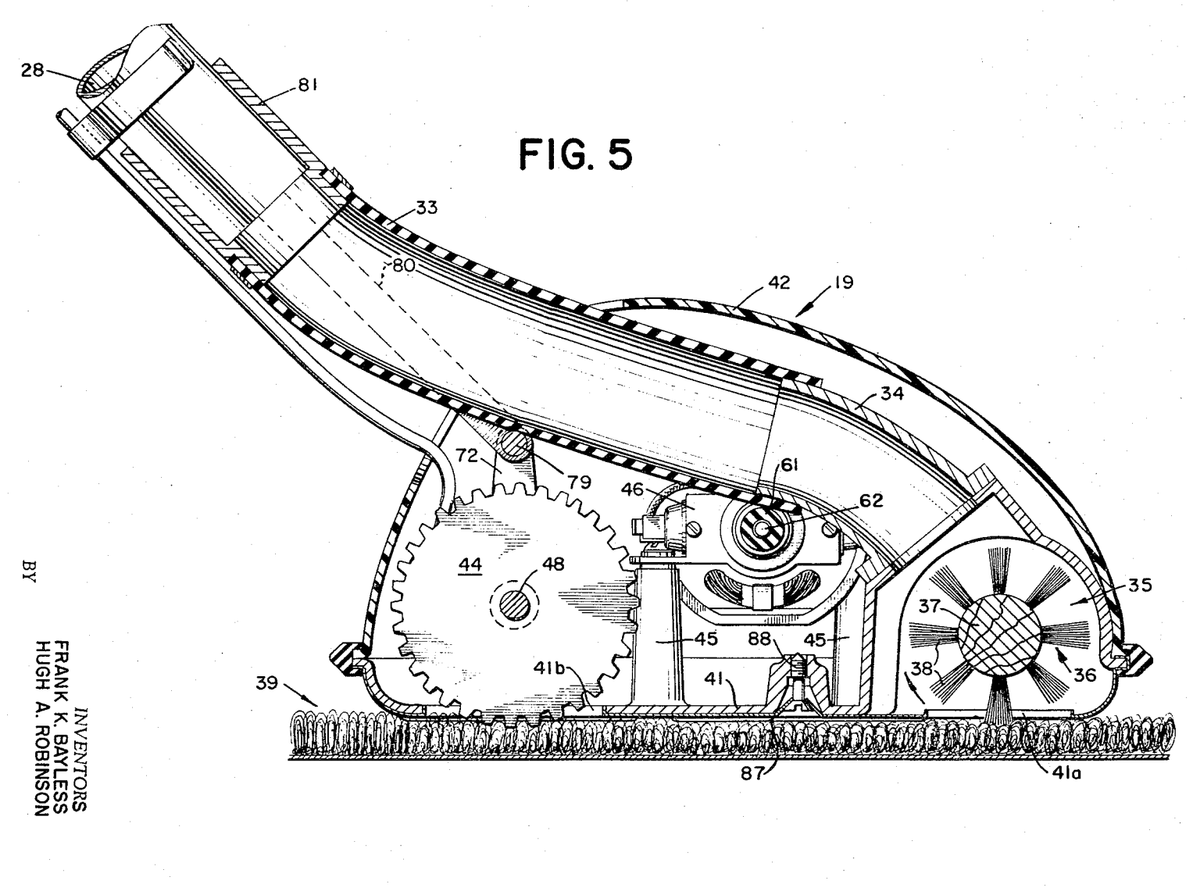
FIG. 5 is a cross-section view as viewed along the section line V—V in FIG. 4.

Another flexible conduit 33 couples the lowermost end of the hollow wand 28 to a rigid duct 34. Rigid duct 34 communicates, as shown in FIG. 5, with a plenum chamber 35 defined in the nozzle 19. Mounted in the plenum chamber 35 for rotation about its horizontal axis of a brush designated generally by the reference number 36. Brush 36 is comprised of a brush dowel 37 and a number of brush bristles 38 extending outwardly therefrom. When the brush 36 is rotated its bristles 38 dislodge dirt and dust from the rug 39 (FIG. 5). The dislodged matter is then drawn by suction-induced airflow through duct 34, conduit 33, wand 28, conduit 30 and the suction inlet pipe 26 and the dislodged matter is collected in the porous dust bag 24. Filtered air emanating from the dust bag 24 passes through the fan 21 and then over the motor 22 to cool the motor. Then the air is exhausted from the bottom of the housing 20 through the openings 40 which are formed in the bottom portion of the housing.

Figure 6:
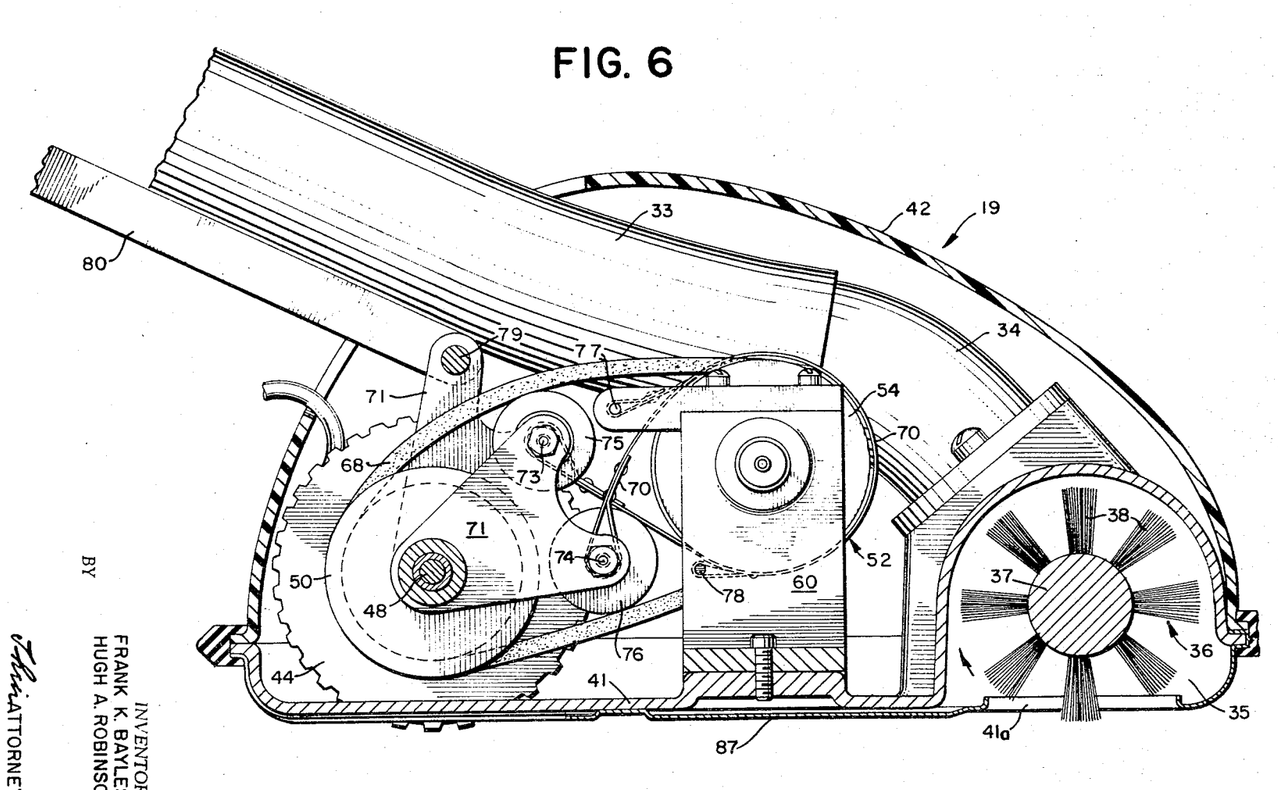
FIG. 6 is a cross-section view as viewed along the section line VI—VI in FIG. 4.
Figure 7:
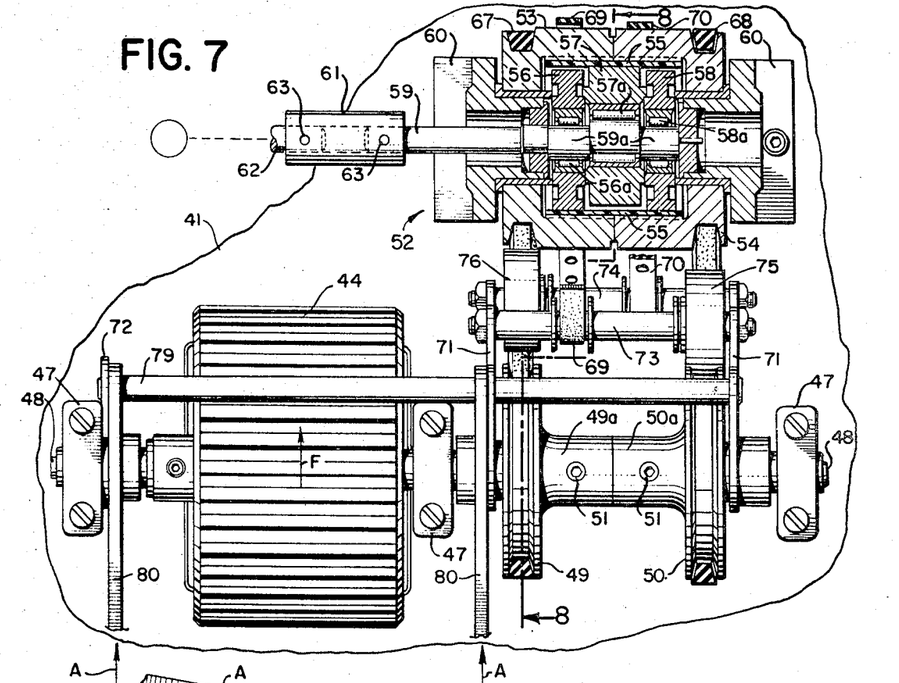
FIG. 7 is an enlarged plan view partly cut away to show, among other things, the transmission assembly, the parts thereof being in position to propel the vacuum cleaner away from the operator in a forward direction.
Figure 8:
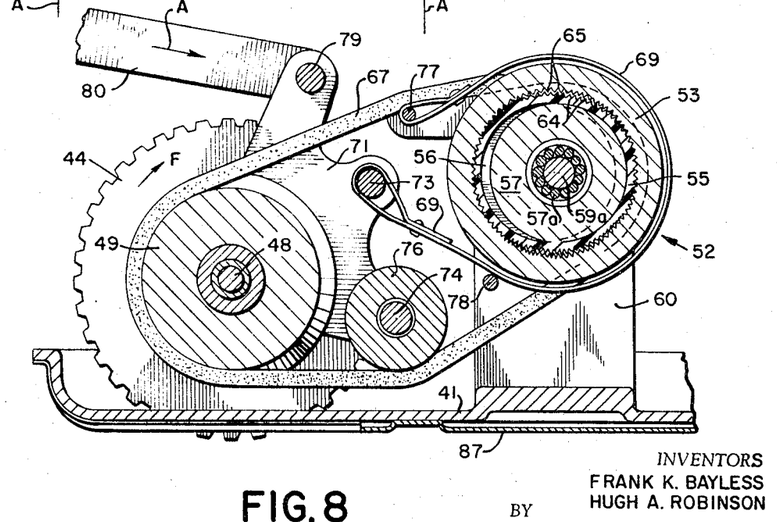
FIG. 8 is a cross-section view as viewed along the section line VIII—VIII in FIG. 7.
Figure 9:
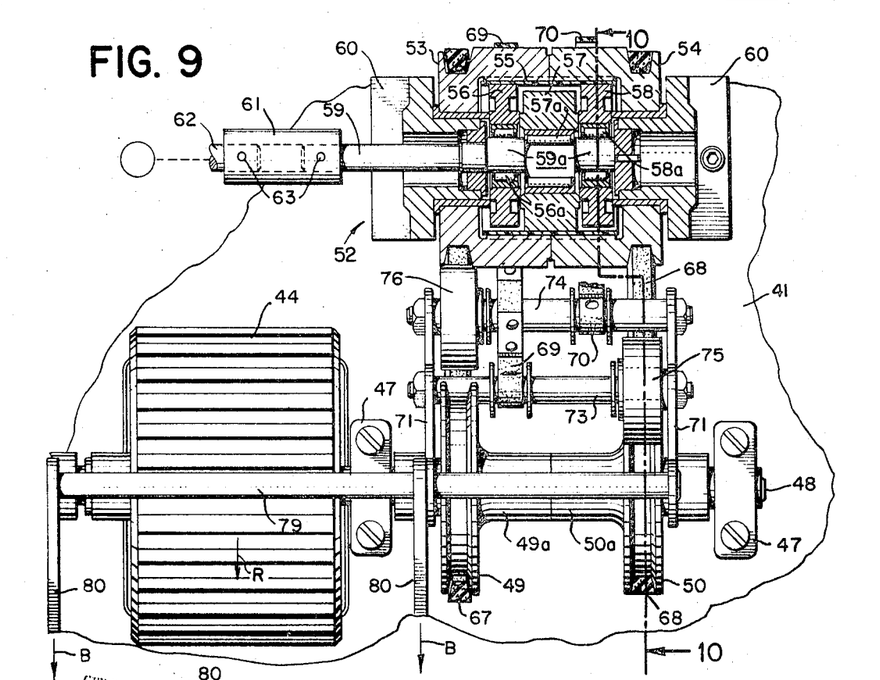
FIG. 9 is another enlarged plan view similar to that shown in FIG. 7 except that the transmission parts are so positioned as to propel the vacuum cleaner in a reverse direction, that is toward the operator.

The nozzle 19 is comprised of a base member 41 over which a cover 42 is fastened. The base member 41 and the cover 42 form a housing for the nozzle 19. The base member 41 which may be formed from an aluminum casting has two openings 41a and 41b formed therein. As shown in FIGS. 5 and 6, opening 41a is formed in the front end of the base member 31 and communicates with the plenum chamber 35. The other opening 41b is located near the rear of the base member 41. The opening 41a permits the bristles 38 of the rotary brush 36 to contact and agitate the rug 39 and also permits the entry of the dislodged dirt and dust into the plenum chamber 35. The opening 41b enables a drive wheel 44 to contact the rug surface and to propel the vacuum cleaner to and fro across the surface. Also formed on the base member 41 are a number of bosses 45 on which an electric motor 46 is mounted by means of screw fasteners or the like. Also mounted on the base member 41 are the three bearing blocks 47 which serve as journals for a long shaft 48 which is secured to the drive wheel 44. Also secured to the shaft 48 are the two drive pulleys 49 and 50. As shown in FIGS. 7 and 9, each of the pulleys 49 and 50 is secured to the shaft 48 by a set screw 51. The set screws 51 pass through holes which are provided in the hub portions 49a and 50a of the pulleys 49 and 50, respectively. The drive pulley 49 is rotated, in the way hereinafter described, in a direction to cause the drive wheel 44 to rotate in the direction indicated by the arrow F in FIGS. 7 and 8 so as to propel the vacuum cleaner in a forward direction, away from the operator. Similarly, the drive pulley 50 is rotated in the opposite direction to cause the drive wheel 44 to rotate in the direction indicated by the arrow R in FIGS. 9 and 10 so that the vacuum cleaner will move in a backward direction, toward the operator.

Mounted on the base member 41 forwardly of the drive pulleys 49 and 50 is a strain wave gearing assembly 52, or Harmonic Drive unit, as it is often called. The strain wave gearing assembly 52 is comprised of: two internally toothed ring gears 53 and 54; one strain gear 55 which has external teeth thereon adapted for meshing engagement with the internal teeth on the ring gears; and a strain inducer including the three cams 56, 57 and 58 which are eccentrically mounted on a crankshaft 59. The strain gear 55 is made of a flexible material such as nylon or the like or suitable steel while the ring gears 53 and 54 as well as the eccentrically mounted cams 56, 57 and 58 are formed from a rigid material such as steel or the like. The opposite ends of the crankshaft 59 are journaled for rotation on two upright bearing members 60 which are secured to the base member 41. One end of the crankshaft 59 is connected by means of a flexible coupling 61 to one end of the armature shaft 62 of the electric motor 46. The flexible coupling 61 may be a tube of elastic material which is fastened to the shafts 59 and 62 by means of the screws 63. The crankshaft 59 has three cranks 59a, formed therein and these cranks are situated coaxially within the roller bearing assemblies 56a, 57a and 58a which are, in turn, located at the center of each of the cams 56, 57 and 58, respectively. The middle crank 59a is disposed 180° out of phase, spatially, with respect to the two outer cranks 59a. Hence, the middle cam 57 is 180° out of phase, spatially, with the cams 56 and 58. The outer cams 56 and 58 are, however, spatially in phase with each other. Hence the rotating strain inducer comprising the three cams 56, 57, 58 and the crankshaft 59 causes a rotary radial deflection or ellipsoidal distortion of the strain gear 55; i.e., the major axis of the eliptically distorted strain gear 55 is rotated.

Figure 10:
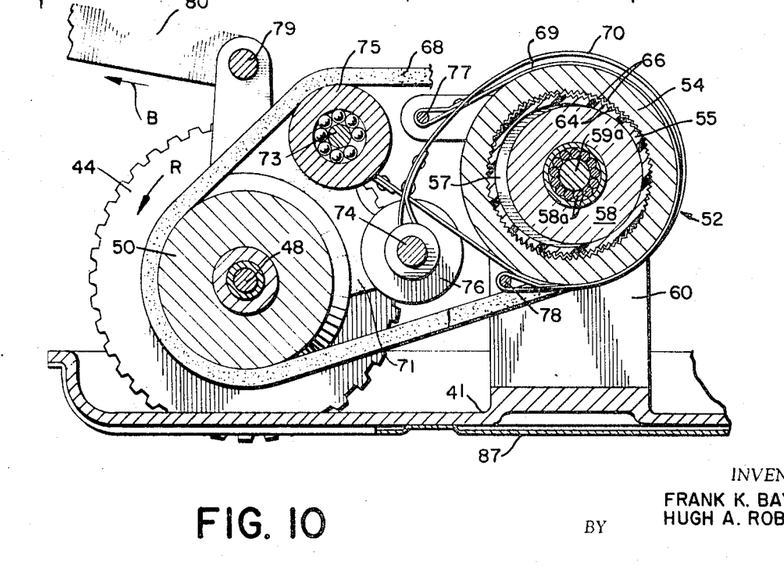
FIG. 10 is a cross-section view as taken along the section line 10—10 in FIG. 9.

The strain gear 55 is provided with a plurality of external teeth 64 on its periphery. The inside of the ring gear 53 has a plurality of teeth 65 and, likewise, the inside of the ring gear 54 is provided with a plurality of teeth 66. When the major axis of the elliptically distorted strain gear 55 rotates, the external teeth 64 on the strain gear 55 which are located at the extremities of the aforesaid major axis move into meshing engagement with the internal teeth 65 and 66 on the ring gears 53 and 54, respectively. As shown at FIGS. 8 and 10 many of the teeth 64 on the strain gear 55 mesh with many of the teeth 65 and 66 on the ring gears 53 and 54. As a result high torques can be transmitted between ring gears 53 and 54 and the strain gear 55.

An endless belt 67 encompasses the ring gear 53 and the drive pulley 49. The endless belt 67 is driven by ring gear 53 and this belt, in turn, rotates the pulley 49. Similarly, an endless belt 68 encompasses the ring gear 54 and the pulley 50. The endless belt 68 is rotated by the ring gear 54 and in turn this belt 68 rotates the pulley 50. In order to arrest the rotary motion of the ring gear 53 there is provided a brake band 69. Similarly, another brake band 70 is provided for arresting the rotary motion of the ring gear 54. Mounted for pivotal movement on the shaft 48 of the drive wheel 44 are the two bell cranks 71 and a lever 72. The bell cranks 71 and the lever 72 are axially spaced, as shown in drawings, along the shaft 48. Fastened to and extending between the two bell cranks 71 are the two shafts 73 and 74. One end of the brake band 69 is secured to the shaft 73 and one end of the brake band 70 is secured to the shaft 74. The opposite ends of the brake bands 69 and 70 are anchored to two shafts 77 and 78, respectively which are supported on the upright bearing members 60. Mounted on the shafts 73 and 74 are two belt tensioning rollers 75 and 76, respectively. The roller 75 tensions the drive belt 68 whenever the two bell cranks 71 are pivoted in a counterclockwise direction as shown in FIG. 10. The roller 76 tensions the belt 67 whenever the two bell cranks 71 are pivotally moved in clockwise direction as shown in FIG. 8.

FIGS. 7 and 8 show the position of the parts when the bell cranks 71 have been moved clockwise. As shown, the roller 76 tensions the drive belt 67 against the outside surface of the ring gear 53 and, simultaneously, the roller 75 relaxes or untensions the drive belt 68 so that the drive belt 68 does not make any appreciable friction contact with the outside surface of the ring gear 54. Also, since the two shafts 73 and 74 have been moved in a clockwise direction the brake band 69 which encompasses the ring gear 53 is slackened by the movement of the shaft 73. As a result, the slackened band 69 will not arrest rotary movement of the ring gear 53. Also, while the brake band 69 is being slackened the shaft 74 tightens the brake band 70 against the outer surface of the ring gear 54, thereby arresting rotary movement of the ring gear 54. As a consequence of having its belt 67 tensioned thereabout and its brake band 69 slackened rotary movement of the ring gear 53 drives the belt 67 and, in turn, the belt 67 rotates to drive pulley 49 and, ultimately, the drive wheel 44 in a clockwise direction as indicated by the arrow F in FIG. 8. Rotation of the drive wheel 44 clockwise propels the vacuum cleaner in a forward direction, away from the operator. The drive pulley 50 will also be rotated as the shaft 48 is rotated by the pulley 49. But this is unobjectionable as the drive belt 68 is then slack and does not make friction contact with the outside surface of the braked ring gear 54.

FIGS. 9 and 10 illustrate the action which occurs when the bell cranks 71 are moved counterclockwise. The roller 75 tightens the drive belt 68 against the outside surface of the ring gear 54 and at the same time the roller 76 relaxes the tension on the drive belt 67 so that the belt 67 does not make good frictional contact with the outside surface of the ring gear 53. Since the two shafts 73 and 74 have been moved counterclockwise, the brake band 70 which encompasses the ring gear 54 is slackened by movement of the shaft 74 and the slackened brake band 70 does not arrest the rotary movement of the ring gear 54. Also, while the brake band 70 is being slackened the shaft 73 tightens the brake band 69 against the outside surface of the ring gear 53 thereby arresting the rotary movement of the ring gear 53. As a result of having the belt 68 tensioned thereabout and the brake band 70 slackened the rotary movement of the ring gear 54 drives the belt 68 and, in turn, the belt 68 rotates the drive pulley 50 and, ultimately, the drive wheel 44 in a counterclockwise direction as indicated by the arrow R in FIG. 10. Thus, the rotation of the drive wheel 44 counterclockwise propells the vacuum cleaner in a reverse direction, toward the operator. The pulley 49 will also be rotated by the shaft 48. But this is unobjectionable as the drive belt 67 is slack and does not make friction contact with the outside surface of the braked ring gear 53.

The two bell cranks 71 and lever 72 are joined together by a long shaft 79. Pivotally coupled to the shaft 79 is a pair of control rods 80. The opposite ends of both of the control rods 80 are secured to a ring member 81 as indicated in FIG. 5. This ring member 81 also serves to connect the end of the rigid hollow wand 28 with an end of the flexible conduit 33. When the operator exerts a slight pushing force against the hand grip 32 of the vacuum cleaner's handle 31 this force is ultimately transmitted to the control rods 80 to move them in a direction indicated by the arrows A in FIGS. 7 and 8. Similarly, when the operator exerts a slight pulling force against the hand grip 32 this force is also transmitted to the control rods 80 to move them in a direction indicated by the arrows B in FIGS. 9 and 10. Thus, the control rods 80 will urge the long shaft 79 as well as the two bell cranks 71 and lever 72 in either a clockwise direction as indicated in FIG. 8 or in a counterclockwise direction as indicated in FIG. 10, and ultimately cause the drive wheel 44 to propel the vacuum cleaner in either a forward direction or in a reverse direction.

In the strain wave gearing assembly 52 the ellipsoidally deformable strain gear 55 has the same number of external teeth 64 as the number of internal teeth 66 on the output ring gear 54. However, the number of teeth 64 on the strain gear 55 is less than the number of internal teeth 65 on the output ring gear 53. Since the strain gear 55 is deformed ellipseoidally the difference between the number of teeth 65 on ring gear 53 and the number of teeth 64 on strain gear 55 is a multiple of two. In the illustrative embodiment hereinbefore described the strain gear 55 and the ring gear 54 are each provided with 98 teeth while the ring gear 53 is provided with 100 teeth. By so doing a speed reduction of 50 to 1 is obtained between the armature shaft 62 and the output ring gear 53 while a speed reduction of 49 to 1 is obtained between the armature shaft 62 and the ring gear 54. moreover, ring gear 53 is rotated in the same direction as the armature shaft 62 when the rotation of the ring gear 54 is arrested. On the other hand, the ring gear 54 is rotated in an opposite direction to that of the armature shaft 62 when the rotation of the ring gear 53 is arrested.

When as shown in FIGS. 7 and 8 the rotation of the ring gear 54 is arrested by brake band 70 and the brake band 69 is slackened to allow the ring gear 53 to rotate, clockwise rotation of the armature shaft 62, as well as of the shaft 59 coupled thereto, and the resulting clockwise rotation of the cranks 59a will cause the cams 56, 57 and 58 to progressively deform the strain gear 55 into elliptical shape, and the major axis of the ellipse will rotate in a clockwise direction. Since the strain gear 55 and the ring gear 54 have the same number of teeth there is no relative motion therebetween and since the ring gear 54 is held stationary the strain gear 55 will likewise remain rotationally stationary. However, since the ring gear 53 has more teeth than the strain gear, it will rotate in the same direction as the shaft 59 which has indicated in FIG. 8 is clockwise. The input to output speed ratio between the armature shaft and the ring gear 53 is determined by dividing the number of teeth on the ring gear 53 (100 teeth) by the difference between the number of teeth on the ring gear 53 and the number of teeth on the strain gear 55 (100 minus 98, or 2 teeth). Thus the input to output speed reduction ratio is 50 to 1. As may be appreciated from FIG. 8 clockwise rotation of the output ring gear 53 is fed to the tensioned belt 67 and this belt 67, in turn, rotates the pulley 49. The rotation of the pulley 49 rotates the drive shaft 48 and, in turn, the drive wheel 44 is rotated in a clockwise direction as indicated by the arrow F to propel the vacuum cleaner in a forward direction, away from the operator.

As shown at FIGS. 9 and 10 when the rotation of the ring gear 53 is arrested by the brake band 69 while the brake band 70 is slackened to permit rotation of the ring gear 54 clockwise rotation of the armature shaft 62, as well as of the shaft 59 coupled thereto, the resulting clockwise rotation of the cranks 59a will cause the cams 56, 57 and 58 to deform the strain gear 55 into elliptical shape, as above described. Again the major axis of the ellipse will rotate in a clockwise direction. Since, the ring gear 54 and the strain gear 55 have the same number of teeth there will be no relative rotation therebetween. However, because of the braking of the ring gear 53, which has two more teeth than the strain gear, the strain gear and the ring gear 54 will rotate together in a counterclockwise direction relative to the armature shaft 62. The input to output speed ratio between the armature shaft 62 and the ring gear 54 is determined by dividing the number of teeth on the strain gear (98 teeth) by the difference between the number of teeth on the strain gear and the number of teeth on the stationary ring gear 53 (98 minus 100, or minus 2 teeth). The input to output ratio or speed reduction is 49 to 1, the minus sign indicating a reverse rotation relative to that of the armature shaft 62. As shown in FIG. 10 the counterclockwise rotation of the ring gear 54 drives the tensioned belt 68 which in turn, rotates the pulley 50. The rotation of the pulley 50, in turn, rotates the drive shaft 48 and the rotation of the drive shaft 48 rotates the drive wheel 44 in the direction indicated by the arrow R. As a result the vacuum cleaner is moved in a rearward direction toward the operator.

As shown in FIG. 6 neither of the brake bands 69 or 70 is tensioned and in addition neither of the drive belts 67 nor 68 is tensioned. Clockwise rotation of the armature shaft 62 as well as the shaft 59 and the resulting eccentric clockwise rotation of the cranks 59a cause the cams 56, 57 and 58 to ellipsoidally deform the strain gear 55. The major axis of the ellipsoidal deformation imparted to the strain gear 55 is as in the aforesaid cases rotated in a clockwise direction. Since the strain gear 55 and the ring gear 54 have the same number of teeth there will be no relative motion between these gears but they will both move together in a counterclockwise direction relative to the armature shaft 62 since the ring gear 54 does not have its motion arrested. The ring gear 53 which has the greater number of teeth will rotate in the same direction as the armature shaft 62; i.e. clockwise direction. Since the ring gear 53 produces a reduction of 50 to 1 in a clockwise direction and since the ring gear 54 produces a reduction of 49 to 1 in a counterclockwise direction there will be a relatively small rotation of the drive shaft 48 even if the drive belts 67 and 68 were sufficiently tensioned to cause net rotation of the drive wheel 44. However, since neither of the drive belts 67 nor 68 are tensioned they do not move as a result of the relative rotations of the ring gears 53 and 54. As a consequence, there is no movement of the drive wheel 44 and the vacuum cleaner will not be propelled either to or fro across the surface to be cleaned. The reason for this is that there is neither a pushing nor pulling motion imparted to the control rods 80. Either a small pushing or pulling force must be exerted on the hand grip 32 of the vacuum cleaner to cause either a forward or a reverse motion of the vacuum cleaner. If no force is exerted against the hand grip 32 the control rods 80 will not exert a sufficient torque on the bell cranks 71 to tension or slaken the appropriate brake bands or the appropriate drive belts. Thus, there will be no rotation of the drive wheel 44.

Figure 4:
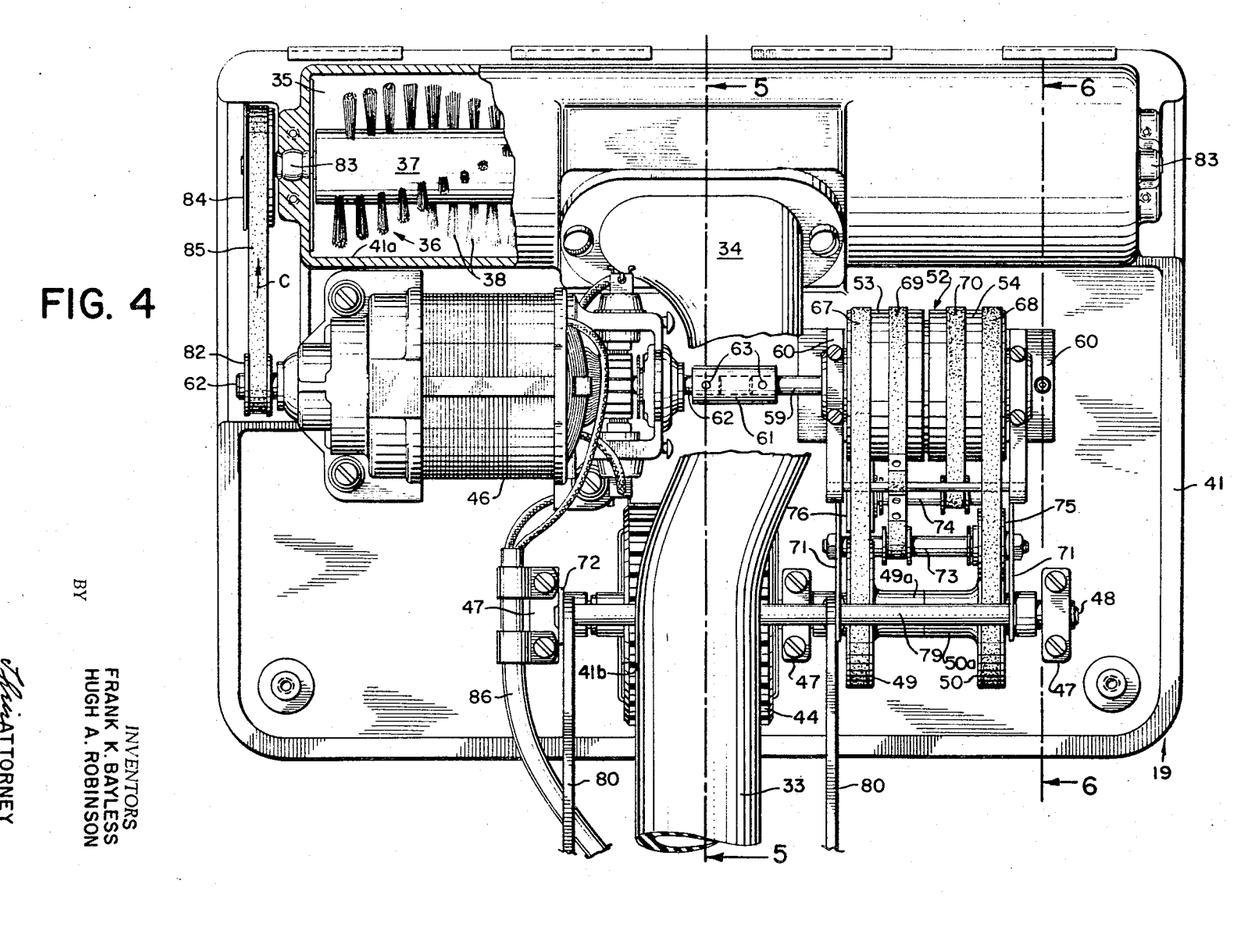
FIG. 4 is a plan view showing the cleaning nozzle of the vacuum cleaner, the nozzle housing being cut away to show the various elements which are mounted on the nozzle.

As shown the armature shaft 62 protrudes from both ends of the motor 46. One end of the armature shaft 62 is coupled to the flexible tubular coupling 61 for rotating the crankshaft 59. The opposite end of the armature shaft 62 is secured to a small drive pulley 82 (FIG. 4). At the opposite ends of the brush dowel 37 there are provided short shafts which are journaled for rotation in the bearing members 83. Fastened to one of the short shafts near one end of the brush dowel 37 is a larger diameter pulley 84. An endless belt 85 is connected between drive pulley 82 and the driven pulley 84. The armature shaft 62 always rotates in the same direction with the result that the belt 85 moves in the direction of the arrow C shown in FIG. 4 to rotate the brush 36 through the driven pulley 84. (FIGS. 5 and 6 indicate the clockwise rotation of the brush 36.) The motor 46 may be a conventional series wound universal motor including a commutator and a pair of carbon brushes. Electrical energy for operating the motor is provided by the two wire electric cord 86 shown in FIG. 4.

In the embodiment shown the base member 41 of the nozzle 19 is formed from an aluminum casting or the like. As a result the base member 41 would present a roughly finished surface against the rug 39. This would require the drive wheel 44 to overcome more friction than is necessary in propelling the vacuum cleaner across the rug. In order to reduce the friction a smooth surface plate 87 which has apertures registered with the apertures 41a and 41b in the base member 41 is fastened by means of the screws 88 to the bottom of the base member 41. This smooth surface plate 87 may be fashioned from chrome plated steel.

Having thus described our invention, what we claim as new and desire to secure by Letters Patent of the United States is:

1. A surface treating machine comprising: a base for contacting a surface to be treated; a wheel rotatively mounted on the base for contacting the surface and for rolling thereon to move the base across the surface; a strain wave gearing assembly mounted on the base and comprising first and second gears, each having a plurality of teeth the first gear having a different number of teeth than the second gear, a radially deflectable strain gear having the same number of teeth as one of the aforesaid gears, means to selectively restrain the first and second gear, and a strain inducer operable for radially deflecting the strain gear to cause successive groups of teeth thereon to mesh with successive groups of teeth on the first gear as well as with successive groups of teeth on the second gear whereby the first gear is urged to rotate in one direction when the second gear is restrained, and the second gear is urged to rotate in an opposite direction when the first gear is restrained; means mounted on the base for operating the strain inducer; and means on the base actuatable for transmitting rotation of either the first or second gear to the wheel to rotate it in either one or an opposite direction, respectively.

2. The machine according to claim 1 wherein the strain inducer is rotated by the operating means and wherein the strain gear is arranged in contact with the strain inducer.

3. The machine according to claim 2 wherein the first and second gears are internally toothed gears, and wherein the strain gear is located coaxially within the two gears and has external teeth thereon adapted for meshing with the internal teeth on the two gears.

4. The machine according to claim 1 wherein the means last mentioned in claim 1 is comprised of pulley means for rotating the wheel, a first normally untensioned endless belt encompassing the first gear and said pulley means, a second normally untensioned endless belt encompassing the second gear and said pulley means, said selective restraining means including first and second normally untensioned brake bands encompassing the first and second gears, respectively, and means is operable for selectively tensioning either the first belt and second band or the second belt and first band in order to either transmit rotation of the first gear to said pulley means while arresting rotation of the second gear or to transmit rotation of the second gear to said pulley means while arresting rotation of the first gear.

5. The machine according to claim 4 further comprising a handle coupled with the selective tensioning means for operating the selective tensioning means in response to relatively small pushing or pulling forces manually applied to the handle.

6. A surface treating machine comprising: a base for contacting a surface to be treated; a wheel rotatively mounted on the base member for contacting the surface and for rolling thereon to move the base across the surface; a strain wave gearing assembly mounted on the base and comprising first and second drive gears, each having a plurality of teeth, the first drive gear having a different number of teeth than the second drive gear, a radially deflectable strain gear having the same number of teeth as one of the aforesaid drive gears, means to selectively restrain one of the first and second gears, and a rotatable strain inducer for radially deflecting the strain gear and causing successive groups of teeth thereon to mesh with successive groups of teeth on the first drive gear as well as with successive groups of teeth on the second drive gear whereby the first drive gear is urged to rotate in one direction when the second drive gear is restrained, and the second gear is urged to rotate in an opposite direction when the first gear is restrained; a motor mounted on the base for rotating the strain inducer; and control means for transmitting rotation of the driven gear to the wheel to rotate it.

7. The machine according to claim 6 wherein said control means comprises a handle coupled with said restraining means and extending upwardly from the base, said restraining means being operable in response to a small manually applied pushing force on the handle to arrest rotation of the second drive gear and transmit rotation of the first drive gear to the wheel to rotate it, and said restraining means being operable in response to a small manually applied pulling force on the handle to arrest rotation of the first drive gear and transmit rotation of the second drive gear to the wheel to rotate it reversely.

8. A surface treating machine comprising: a base for contacting a surface to be treated; a wheel rotatively mounted on the base for contacting the surface and for rolling thereon to move the base across the surface; a strain wave gearing assembly mounted on the base and comprising first and second gears each having a plurality of teeth, the first gear having a different number of teeth than the second gear, a radially deflectable strain gear having the same number of teeth as one of the aforesaid gears, brake means alternatively operable to restrain the first and second gears, and a rotatable strain inducer for radially deflecting the strain gear and causing successive groups of teeth thereon to mesh with successive groups of teeth on the first gear as well as with successive groups of teeth on the second gear whereby the first gear is urged to rotate in one direction and the second gear is urged to rotate in an opposite direction; a motor mounted on the base for rotating the strain inducer; pulley means for rotating the wheel; a first normally untensioned endless belt encompassing the first gear and the pulley means; a second normally untensioned endless belt encompassing the second gear and the pulley means; said brake means including first and second normally untensioned brake bands encompassing the first and second gears, respectively; a bell crank pivotally mounted on the base and coupled with both of the brake bands; first and second belt tensioning rollers mounted on the bell crank and located adjacent the first and second belts, respectively; and rod means connected to the bell crank and movable for selectively pivoting the bell crank in either one direction or in an opposite direction, said bell crank when pivoted in said one direction tensioning the second brake band and urging the first roller against the first belt to tension the first belt whereby the tensioned second brake band arrests rotation of the second gear and the tensioned first belt transmits rotation of the first gear to the pulley means causing said pulley means to rotate the wheel in one direction, said bell crank when pivoted in said opposite direction tensioning the first brake band and urging the second roller against the second belt to tension the second belt whereby the tensioned first band arrests rotation of the first gear and the tensioned second belt transmits rotation of the second gear to the pulley means causing said pulley means to rotate the wheel in an opposite direction.

9. In a self-propelled appliance having a drive wheel, a motor driven shaft, a harmonic drive transmission having in coaxial relation a rotary cam means operatively connected to said shaft, a strain gear the major axis of which is rotatably driven by said cam means, and a pair of ring gears independently and respectively meshing with said strain gear and one of which ring gears has teeth differing in number from that of the strain gear, and manually controlled means for selectively connecting the output of one of said ring gears with the drive wheel while restraining operation of the other ring gear, the arrangement being such that the operation of said manual control means renders ineffective the output from the other of said ring gears, whereby the appliance is drivable in either of two selected directions.

10. A reversibly self-propelled machine comprising, a base, a wheel rotatably mounted on the base to provide traction in either of two directions, a strain wave gearing assembly mounted on the base and including a first and second gears respectively having a plurality of teeth, the teeth on the first gear being different in number than those on the second gear, a radially deflectible strain gear having the same number of teeth as one of the aforesaid gears and a strain induced operable for radially deflecting the strain gear to cause its teeth progressively to mesh with teeth on the first gear as well as with successive teeth on the second gear, mechanism for alternately restraining the first and second gears whereby the first gear is urged to rotate in one direction upon restraint of the second gear, and the second gear is urged to rotate in an opposite direction upon restraint of the first gear, means mounted on the base for operating the strain inducer, and a single control means on the base actuatable for transmitting rotation of either the first or second gear to the wheel to drive it in either of said two directions.

11. In a vehicle, a rotatable wheel for providing traction, a strain wave gearing assembly comprising first and second gears respectively having a plurality of teeth, the first gear having a different number of teeth than the second gear, a radially deflectible strain gear having the same number of teeth as one of the aforesaid gears, and a strain inducer for radially deflecting the strain gear to cause successive groups of teeth thereon to mesh with successive groups of teeth on the first and second gears; motor means for unidirectionally rotating the strain inducer; and manual control means including a single handle movable forwardly and reversely correspondingly to operate the vehicle, said control means including means responsive to the movement of said handle for selectively restraining the first and second gears whereby the first gear is rotatable in one direction when the second gear is restrained and the second gear is rotatable in an opposite direction when the first gear is restrained, and mechanism operatively connecting the first and second gears to the traction wheel to drive it according to the forward or reverse movement of the control handle.

References Cited

UNITED STATES PATENTS

| 1,268,131 | 6/1918 | Ledwinka | 74—768 |
|---|---|---|---|
| 2,906,143 | 9/1959 | Musser | 74—640 |
| 2,925,134 | 2/1960 | Cunningham | 74—768 X |
| 2,950,772 | 8/1960 | Dostal et al. | 180—19 X |

KENNETH H. BETTS, *Primary Examiner.*

J. A. PEKAR, *Assistant Examiner.*

U.S. Cl. X.R.

15—49; 74—640